US005277505A

United States Patent [19]

Nurnberg et al.

[11] Patent Number: 5,277,505

[45] Date of Patent: Jan. 11, 1994

[54] ADHESIVE ATTACHING SYSTEM

[75] Inventors: Thomas R. Nurnberg, Bettendorf, Iowa; James J. VanMeenen, Atkinson, Ill.

[73] Assignee: Montgomery Elevator Company, Moline, Ill.

[21] Appl. No.: 999,395

[22] Filed: Dec. 31, 1992

Related U.S. Application Data

[62] Division of Ser. No. 913,831, Jul. 16, 1992, Pat. No. 5,205,391.

[51] Int. Cl.[5] .................... F16B 5/00

[52] U.S. Cl. .................... 403/271; 403/272; 403/265

[58] Field of Search .................... 403/272, 271, 270, 265, 403/267, 174, 404; 219/86.1

[56] References Cited

U.S. PATENT DOCUMENTS 2,396,320 3/1946 Gaudenzo .................... 403/271
4,187,407 2/1980 Marko .................... 403/271
4,340,803 7/1982 Coyle .
4,646,907 3/1987 Streibig .................... 198/335
4,791,765 12/1988 Noggle .
5,205,391 4/1993 Nurnberg .

*Primary Examiner*—Dave W. Arola
*Assistant Examiner*—Anthony Knight
*Attorney, Agent, or Firm*—Wood, Philips, VanSanten, Hoffman & Ertel

[57] ABSTRACT

A system is provided for adhesively attaching a first member to a generally planar portion of a second member. The system includes an attachment clip having a first, generally planar portion and a second portion remote from the first portion adapted for attachment to the first member. A generally planar base is sandwiched between the planar portion of the attachment clip and the planar portion of the second member. An adhesive is located between the base and the planar portion of the second member. A weld is provided between the base and the planar portion of the attachment clip. Therefore, "peel" stresses are eliminated between the base and the planar portion of the second member, as the weld develops a tensile load between the base and the planar portion of the attachment clip.

4 Claims, 1 Drawing Sheet

ADHESIVE ATTACHING SYSTEM

This is a division of application Ser. No. 07/913,831 filed Jul. 16, 1992, now U.S. Pat. No. 5,205,391.

FIELD OF THE INVENTION

This invention generally relates to a system for adhesively attaching a first member to a generally planar portion of a second member and, particularly, the adhesive attaching system has particular applications in a passenger conveyor such as an escalator.

BACKGROUND OF THE INVENTION

There are various environments wherein it is desirable or necessary to attach a pair of members, such as metal components, wherein the attachment is made at a generally planar portion of one of the members. A conventional form of attachment is by means of simple spot welds. However, if the generally planar attaching portion of the one member is of sheet metal material, spot welds cause blemishes in the sheet material on the side thereof opposite the location of the weld itself. Such blemishes are undesirable or unacceptable in applications wherein smooth, unblemished or polished surfaces are aesthetically required.

As an example, in the art of passenger conveyors, such as horizontal walkways or escalators, a passenger conveyor typically includes a series of passenger platforms or steps which are driven in an endless path between horizontally spaced landings. The conveyor includes a main body frame supported by the floors or other support structures of a building, for instance, and, usually, the overall passenger conveyor construction includes a balustrade about which hand rails are circulated in an endless path generally in synchronism with the movable platforms. Kick skirts run along opposite sides of the conveyor, with the passenger platforms being disposed between the skirts. The kick skirts usually are generally vertically oriented, and decks are inclined from the tops of the skirts, transversely outwardly to the bottoms of the balustrades on opposite sides of the conveyor. The decks are removable from the kick skirts to afford access to interior components of the conveyor so that the steps or platforms do not have to be removed. Various attachment systems are used to removably attach the decks to the skirts.

In this passenger conveyor environment, the kick skirts and decks typically are fabricated of sheet metal material, such as stainless steel. Escalators and walkways aesthetically require smooth, unblemished and polished surfaces on the inwardly exposed sides of the kick skirts and decks. When attachment clips are used between the skirts and decks, the attachment clips often are spot welded to one of the components and removably attached to the other component. Spot welding causes blemishes and requires significant polishing and finishing of the inwardly exposed surfaces to remove the blemishes. Such polishing and finishing is time consuming and is not cost effective.

As an alternative to spot welding attachment systems, adhesive glues provide potential for an "unblemished" attachment system. However, adhesive glues are very limited in strength when subjected to a "peel" type of loading which generates extremely high tensile stresses typical of the type of connections described above.

This invention is directed to solving the above problems by providing an adhesive attachment system which is designed such that, when a pair of members are attached, the system eliminates the extreme "peel" stresses and develops a more proportional tension stress in the attachment.

SUMMARY OF THE INVENTION

An object, therefore, of the invention is to provide a new and improved adhesive attachment system of the character described.

Generally, the invention contemplates a system for attaching a first member to a generally planar portion of a second member. An attachment clip is provided with a first, generally planar portion and a second portion remote from the first portion adapted for attachment to the first member. A generally planar base is sandwiched between the planar portion of the attachment clip and the planar portion of the second member. Adhesive means are located between the base and the planar portion of the second member, and weld means are provided between the base and the planar portion of the attachment clip.

In a passenger conveyor environment, the adhesive attaching system can be advantageously used between a sheet metal kick skirt member and a sheet metal deck member, wherein one of the members includes a generally planar portion. The attachment clip has a generally planar portion at one end, and an opposite end is adapted to be coupled to the other of the kick skirt and deck members. The generally planar base is sandwiched between the planar portion of the attachment clip and the planar portion of the one of the kick skirt and deck members. The adhesive means are located between the base and the planar portion of the one of the kick skirt and deck members. The weld means, again, are located between the base and the planar portion of the attachment clip.

The weld means can take the form of spot welds located inwardly of a peripheral edge of the planar portion of the attachment clip. In the preferred embodiment of the invention, the planar portion of the attachment clip has a given area, and a spot weld is located generally at a center point of the area.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
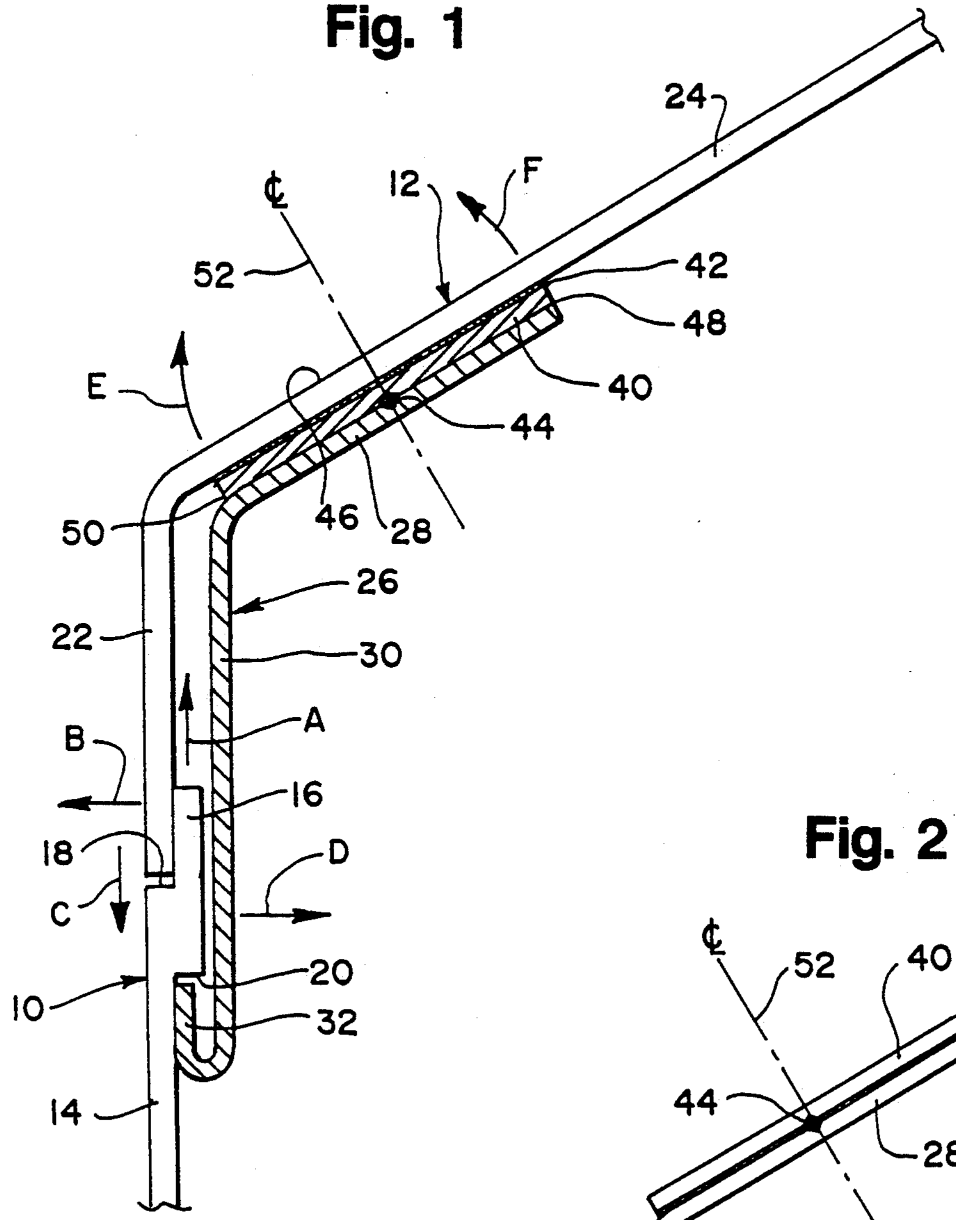
FIG. 1 is a vertical section through an interface area between a kick skirt and a deck of a passenger conveyor and employing the adhesive attaching system of the invention.

Referring to the drawings in greater detail, the invention is illustrated in an attachment system for attaching a kick skirt, generally designated 10, to a deck, generally designated 12, of a passenger conveyor. As is known and as described above, kick skirts and decks conventionally run along opposite sides of the passenger conveyor, with the passenger platforms being disposed between the kick skirts, to the left of skirt 10 in FIG. 1. In other words, the structure shown in FIG. 1 would be located at the right-hand side of the passenger conveyor, when looking at the figure, and the top of deck 12 would lead to a balustrade about which a hand rail is circulated.

Kick skirt 10 is fabricated of sheet metal material, such as stainless steel or the like, and includes a vertical portion 14 and an outwardly offset portion 16 along the top edge of the vertical portion. An upwardly facing shoulder 18, therefore, is defined on the inside of the skirt, and a downwardly facing shoulder 20 is defined on the outside of the skirt.

Deck 12 also is fabricated of sheet metal material, such as stainless steel or the like, and includes a vertically oriented portion 22 and an outwardly and upwardly inclined portion 24 which leads to the bottom of the balustrade. The bottom edge of vertically oriented portion 22 of the deck is coplanar with vertically oriented portion 14 of skirt 10, with the bottom edge being located above shoulder 18 and inside the offset portion 16 of the skirt. It often is desirable to attach deck 12 to kick skirt 10 so that the deck can be removed to afford access to interior components of the conveyor, such as to the right of the assembly shown in FIG. 1.

Figure 2:
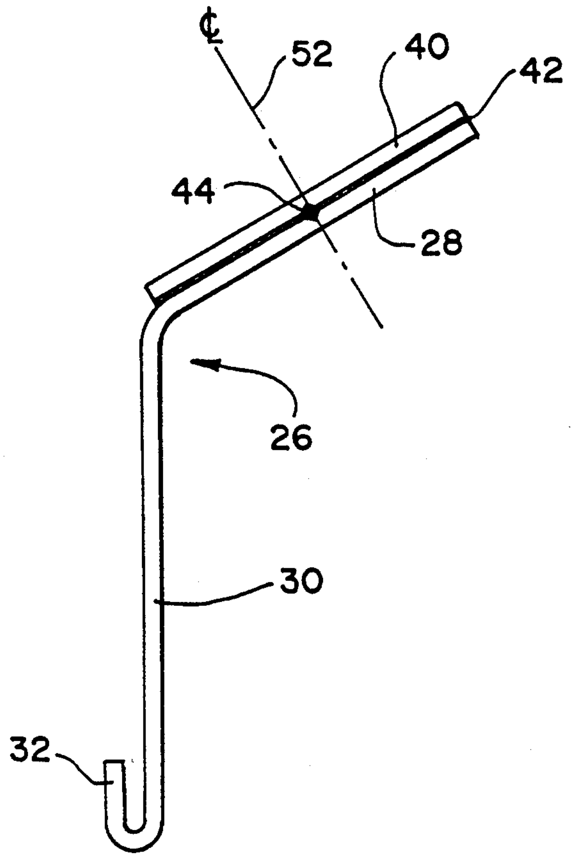
FIG. 2 is a side elevational view of the attachment clip and base component of the attaching system.

Referring to FIG. 2 in conjunction with FIG. 1, the attachment system of the invention includes an attachment clip, generally designated 26. A plurality of the attachment clips would be spaced along the conveyor, such as two feet apart. The attachment clip includes a generally planar portion 28 at one end for use in attaching the clip to deck 12. A vertically oriented portion 30 depends from planar portion 28 and terminates in an upwardly turned hook 32 which is located beneath shoulder 20 of kick skirt 10. Therefore, the deck cannot be removed from the skirt in the direction of arrow "A", because of the potential abutment of hook 32 with shoulder 20. The deck cannot move inwardly relative to the skirt in the direction of arrow "B", because of the abutment of hook 32 against the outside of vertically oriented portion 14 of the skirt. The deck, of course, is supported in a downward direction, in the direction of arrow "C", because of the abutment of the bottom edge of the vertically oriented portion 22 of the deck with shoulder 18 of the skirt. Lastly, the deck cannot move outwardly in the direction of arrow "D", because of the abutment of the bottom edge of the deck with the offset portion 16 of the skirt. Therefore, when planar portion 28 is appropriately attached to inclined portion 24 of deck 12, the deck is secured to the skirt against movement in all directions. In assembly, the deck is assembled to the skirt simply by snapping hook 32 over offset portion 16 of the skirt, until the hook snaps behind shoulder 20. Attachment clip 26 is fabricated of thin metal material, such as cold rolled steel, and the deck can be removed from the skirt simply by rotating the deck outwardly which moves hook 32 outwardly of shoulder 20, in the direction of arrow "D", with the deck being lifted off of the skirt.

The adhesive attaching system of the invention contemplates that a generally planar base component 40 be sandwiched between planar portion 28 of attachment clip 26 and planar inclined portion 24 of deck 12. The base may be fabricated of sheet metal material, such as cold rolled steel. Adhesive means, such as a two-part epoxy glue, is applied at the mating interface or surfaces between base 40 and deck portion 24, as at 42. Planar portion 28 of the attachment clip is welded to base 40, as by a spot weld at 44. Therefore, with the attachment clip securely attached to the base by a spot weld, and with the base adhesively attached to the deck by the use of adhesives, the inside surface of the deck, as at 46, can be smooth and polished without the attachment system of the invention causing any blemishes in the aesthetically polished surface.

From the foregoing, it generally can be understood that the extreme "peel" stresses often created on adhesive interfaces are eliminated by the attachment system of the invention, and the system develops a more proportional tension stress alternative. More specifically, any "peel" load applied to attachment clip 26, particularly at its planar portion 28, now develops a tensile load at spot weld 44 between the clip and base 40, with a fulcrum point at an extreme edge of planar portion 28 of the clip. In other words, since the spot weld is located generally at the center of base 40 and away from the "peel" edge thereof, with the fulcrum point at an extreme edge of the base, a tensile stress is developed in the adhesive interface between the base and the planar portion of the clip, increasing relatively linearly from the fulcrum point to the extreme opposite edge of the base. While this stress may not be absolutely uniform, the maximum stress is greatly reduced and increases only linearly across the base rather than exponentially as in a "peel" loading.

In particular, if there is a situation which causes forces on deck 24 to move the deck in the direction of arrow "E", there will be no peel load applied to the clip member, because a tensile load is created at spot weld 44, with a fulcrum point created at 48, i.e. at the extreme edge of base 40 and the planar portion 28 of the attachment clip. Likewise, if a load is created in the direction of arrow "F", a tensile load is created at spot weld 44, with a fulcrum point 50 at the opposite extreme edge of the base and the planar portion of the attachment clip. This is true about the entire periphery of the area of the base and the interface area with planar portion 28 of the attachment clip.

It should be understood that spot weld 44 does not have to be on a center line 52 of base 40. This location of the spot weld is advantageous when loads might be expected on the attachment area in a sort of omni-directional environment. However, it can be contemplated that situations may arise wherein the attachment system of the invention can be used where a particular loading is predominant. For instance, a situation may be presented wherein the loading normally will always be as indicated by arrow "E" in FIG. 1. In such a situation, spot weld 44 may be located further to the left as viewed in the drawing, i.e. closer to edge 50. Therefore, the fulcrum between the spot weld and edge 48 will be longer. Of course, other variations in the location of the spot weld are contemplated.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A system for adhesively attaching a first member to a generally planar portion of a second member, comprising:

an attachment clip having a first, generally planar metal portion and a second portion remote from the first portion adapted for attachment to said first member;

a generally planar metal base sandwiched between the generally planar portion of the attachment clip and the generally planar portion of said second member;

adhesive means between the base and the generally planar portion of said second member;

weld means between the base and the generally planar portion of the attachment clip; and said attachment clip and said base being fabricated of sheet metal material.

2. The system of claim 1 wherein said weld means comprises a spot weld.

3. The system of claim 2 wherein said spot weld is located inwardly of a peripheral edge of the generally planar portion of the attachment clip.

4. The system of claim 3 wherein said generally planar portion of the attachment clip has a given area, and said spot weld is located generally at a center point of the area.

* * * * *